US007079260B2

(12) United States Patent
Montgomery

(10) Patent No.: US 7,079,260 B2
(45) Date of Patent: Jul. 18, 2006

(54) OPTICAL PROFILE DETERMINING APPARATUS AND ASSOCIATED METHODS INCLUDING THE USE OF A PLURALITY OF WAVELENGTHS IN THE REFERENCE BEAM AND A PLURALITY OF WAVELENGTHS IN A REFLECTIVE TRANSIT BEAM

(75) Inventor: Robert M. Montgomery, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 252 days.

(21) Appl. No.: 10/631,271

(22) Filed: Jul. 31, 2003

(65) Prior Publication Data

US 2005/0024647 A1 Feb. 3, 2005

(51) Int. Cl.
*G01B 9/02* (2006.01)
*G01P 3/36* (2006.01)

(52) U.S. Cl. .................. 356/511; 356/28.5; 356/498
(58) Field of Classification Search ............... 356/495, 356/28.5, 485–489, 492–494, 497, 479, 511–515, 356/498
See application file for complete search history.

(56) References Cited

U.S. PATENT DOCUMENTS

| 5,071,251 | A | * | 12/1991 | Hochberg et al. | ........... 356/513 |
| 5,153,669 | A | * | 10/1992 | DeGroot | ...................... 356/489 |
| 5,371,587 | A | * | 12/1994 | de Groot et al. | ............ 356/486 |
| 5,777,736 | A | * | 7/1998 | Horton | ....................... 356/456 |
| 5,835,199 | A | * | 11/1998 | Phillips et al. | ............. 356/28.5 |
| 6,134,003 | A | * | 10/2000 | Tearney et al. | ............. 356/479 |
| 6,181,430 | B1 | * | 1/2001 | Meyer et al. | ............... 356/495 |
| 6,293,027 | B1 | | 9/2001 | Elliot et al. | ................... 33/546 |
| 6,934,035 | B1 | * | 8/2005 | Yang et al. | .................. 356/485 |
| 2001/0049709 | A1 | * | 12/2001 | Ge | ............................. 708/403 |

\* cited by examiner

*Primary Examiner*—Gregory J. Toatley, Jr.
*Assistant Examiner*—Patrick J. Connolly
(74) *Attorney, Agent, or Firm*—Allen, Dyer, Doppelt, Milbrath & Gilchrist, P.A.

(57) ABSTRACT

An optical profile determining apparatus includes an optical detector and an optical source. The optical source generates a transmit beam including a plurality of wavelengths, and generates a reference beam including the plurality of wavelengths. Optical elements direct the transmit beam to a target, direct a resulting reflected transmit beam back from the target to the optical detector, and combine the reference beam with the reflected transmit beam so that a profile of the target is based upon fringe contrast produced by the plurality of wavelengths in the reference beam and the plurality of wavelengths in the reflected transmit beam.

38 Claims, 4 Drawing Sheets

OPTICAL PROFILE DETERMINING APPARATUS AND ASSOCIATED METHODS INCLUDING THE USE OF A PLURALITY OF WAVELENGTHS IN THE REFERENCE BEAM AND A PLURALITY OF WAVELENGTHS IN A REFLECTIVE TRANSIT BEAM

GOVERNMENT LICENSE RIGHTS

The U.S. Government has a paid-up license in this invention and the right in limited circumstances to require the patent owner to license others on reasonable terms as provided for by the terms of contract No. NAS1-01079, awarded by NASA.

FIELD OF THE INVENTION

The present invention relates to the field of optics, and more particularly, to an optical profile determining apparatus and associated methods.

BACKGROUND OF THE INVENTION

Parabolic antenna reflectors are widely used in both ground-based and space-based applications. These structures are large in size, and typically have a diameter of up to 20 meters. It is important that parabolic antenna reflectors be accurately built to avoid performance degradations that may result from thermal distortion, manufacturing tolerances, alignment tolerances, deployment tolerances or other error sources.

To determine how accurately ground-based parabolic antenna reflectors are built, interferometers are commonly used. The accuracy and precision of an interferometer is generally within fractions of its operating wavelength. Interferometers are ideal for profiling ground-based parabolic antenna reflectors because these structures are built very rigid. Rigid structures do not sway or vibrate, and consequently, can be measured with relatively high precision (for example, micron range uncertainties can be profiled).

A spaced-based parabolic antenna reflector typically includes a rib-like structure that folds up like an umbrella so that it can be loaded into a rocket and carried into outer space. Once in outer space, the rib-like structure is removed from the rocket and unfolded. Unfortunately, a space-based parabolic antenna reflector does not have the same structural integrity and stiffness as a ground-based parabolic antenna reflector. After being unfolded, the resulting shape may be distorted from an ideal desired shape, and this causes performance degradation in applications that depend on precise dimensional relationships.

In most cases, this degradation in performance can be corrected by adjusting the shape of the parabolic antenna reflector using on-board actuators, provided the distortions are accurately measured. However, a conventional interferometer can not be used to measure these distortions because the movement or sway of spaced-based parabolic antenna reflectors is much greater than the unambiguous measuring range of the interferometer.

When using an interferometer, light or dark bands are produced by the interference or diffraction of light being reflected from a parabolic antenna reflector to an optical detector. If the light and dark bands (i.e., fringes) are spaced in the micron range, yet the space-based parabolic antenna reflector being profiled is swaying in the millimeter range, this causes large uncertainties due to fringe ambiguity and fringe washout. Consequently, an interferometer can not be used for profiling the space-based parabolic antenna reflector, and other techniques must be used.

U.S. Pat. No. 6,293,027 to Elliott et al. discloses one such technique. A first set of targets on the space-based parabolic antenna reflector is scanned by an attitude transfer system to measure the angular location and range of each target relative to a reference point on another part of the satellite having a frame of reference. The orientation of the parabolic antenna reflector is then determined from the measured locations of the targets. A second set of targets on the parabolic antenna reflector is scanned by a figure sensing module located at a reference point on the reflector itself. From measured angular locations and ranges of the second set of targets, shape distortions in the parabolic antenna reflector can be determined, and distortion may be corrected. Unfortunately, since each of the first and second sets of targets is scanned, this technique may be relatively complex and slow in the sense that all of the targets are sequentially measured.

SUMMARY OF THE INVENTION

In view of the foregoing background, it is therefore an object of the present invention to profile targets, such as space-based antenna, that are not readily profiled with a conventional interferometer.

This and other objects, features, and advantages in accordance with the present invention are provided by an optical profile determining apparatus comprising an optical detector, and an optical source for generating a transmit beam comprising a plurality of wavelengths, and for generating a reference beam comprising the plurality of wavelengths.

The optical profile determining apparatus further comprises at least one optical element for directing the transmit beam to a target, for directing a resulting reflected transmit beam back from the target to the optical detector, and for combining the reference beam with the reflected transmit beam so that a profile of the target is based upon fringe contrast produced by the plurality of wavelengths in the reference beam and the plurality of wavelengths in the reflected transmit beam.

The present invention advantageously profiles a target by using fringe contrast that is determined by the relative phase between two sets of fringes, i.e., the fringes provided by the plurality of wavelengths in the reference beam versus the fringes provided by the plurality of wavelengths in the reflected transmit beam. This is in contrast to an interferometer that determines an absolute fringe at a given frequency.

The optical source may comprise a plurality of lasers for generating a plurality of individual transmit beams, with each laser operating at a different wavelength. A wavelength multiplexer multiplexes the plurality of transmit beams into a combined transmit beam. A splitter is downstream from the multiplexer for splitting the combined transmit beam into a first beam and a second beam. The first beam defines the transmit beam. A delay circuit is downstream from the splitter for delaying the second beam so that the second beam defines the reference beam.

The accuracy of the optical profile determining apparatus is advantageously selected based upon the spacing between the plurality of wavelengths, which is known as the ambiguity interval. If the target being profiled is not very rigid and vibrates or sways (such as a spaced-based structure), then the wavelengths are selected so that they are spaced close together—which supports a relatively low precision, large, ambiguity interval. Conversely, if the target being profiled is rigid and does not vibrate or sway (such as a ground-based structure), then the wavelengths are spaced further apart—which supports a relatively high precision, small, ambiguity interval. This feature of the present invention advantageously allows the accuracy of the optical profile determining apparatus to be commensurate with the variability of the target being profiled.

The at least one optical element may comprise a first lens for colliminating the multiplexed transmit beam, a lenslet array downstream from the first lens for directing the transmit beam toward the target, and a second lens downstream from the lenslet array for projecting the transmit beam onto the target at predetermined locations thereon. The optical profile determining apparatus may further comprise a plurality of spaced apart reflectors at the respective predetermined locations on the target for providing the reflected transmit beam. The lenslet array may comprise a plurality of lenses, with each lens being associated with a respective reflector.

An imaging lens may direct the reflected transmit beam and the reference beam onto the optical detector. The optical detector computes a distance to the target for each reflector based upon a corresponding fringe contrast to determine the profile. In particular, the optical detector may compute the distance to the target based upon an amplitude of the fringe contrast. The amplitude of the fringe contrast may be used in a ratio of a peak-to-peak variation in intensity to an average intensity when computing the distance to the target.

The optical detector may comprises a charge-coupled device (CCD) camera, and the profile of the target may be based upon a single exposure of the CCD camera. Since a single exposure may be used for profiling the target, no moving parts are required. In other words, the plurality of reflectors do not have to be sequentially scanned by the optical source or detector.

Another aspect of the present invention is directed to a method for determining a profile of a target. The method comprises generating a transmit beam comprising a plurality of wavelengths and a reference beam also comprising the plurality of wavelengths, and directing the transmit beam to the target. A resulting reflected transmit beam is directed back from the target to an optical detector. The method further comprises combining the reference beam with the reflected transmit beam so that a profile of the target is based upon fringe contrast produced by the plurality of wavelengths in the reference beam and the plurality of wavelengths in the reflected transmit beam.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
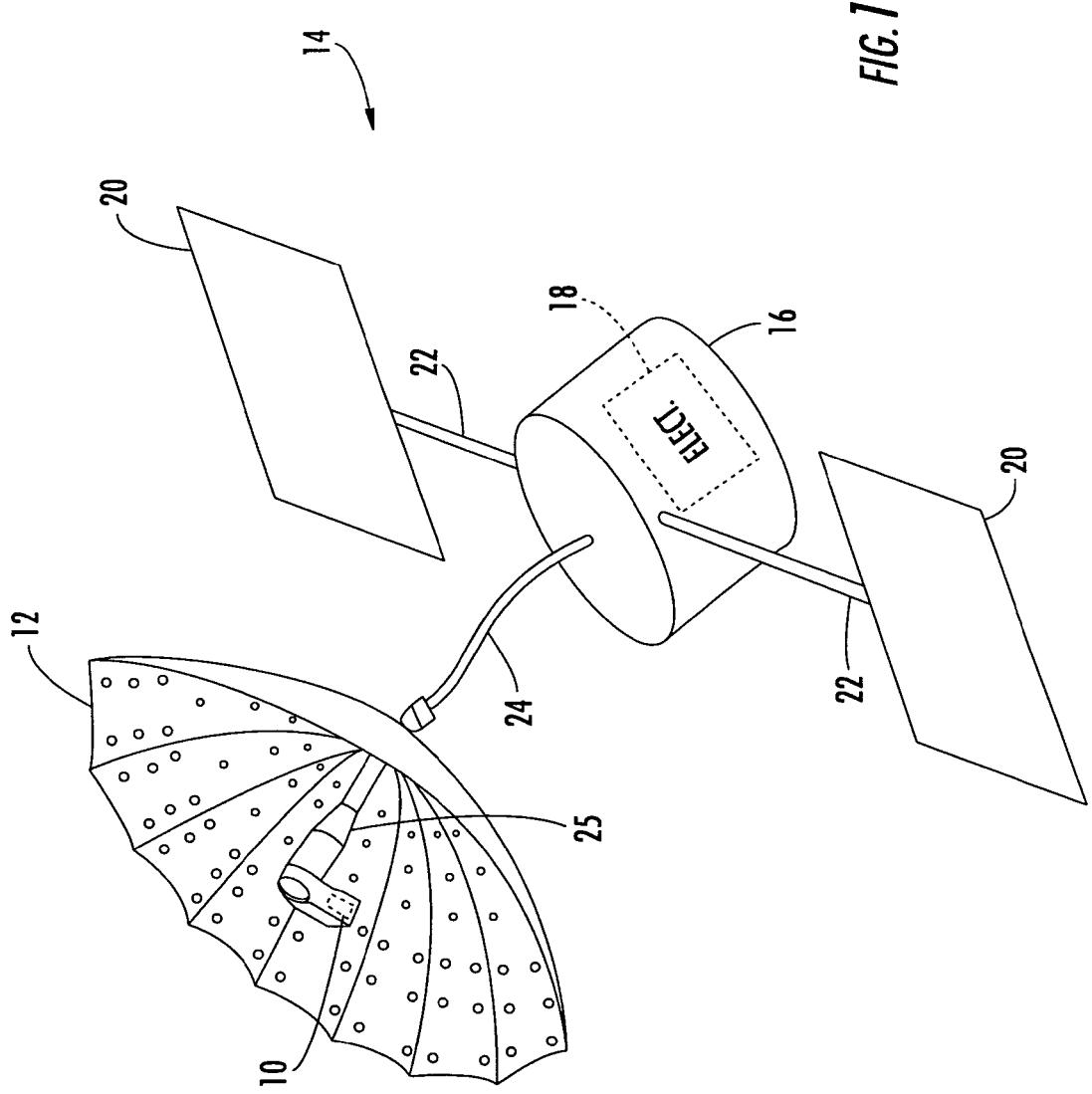
FIG. 1 is a schematic perspective view of an optical profile determining apparatus with a space-based parabolic antenna reflector in accordance with the present invention.
Figure 2:
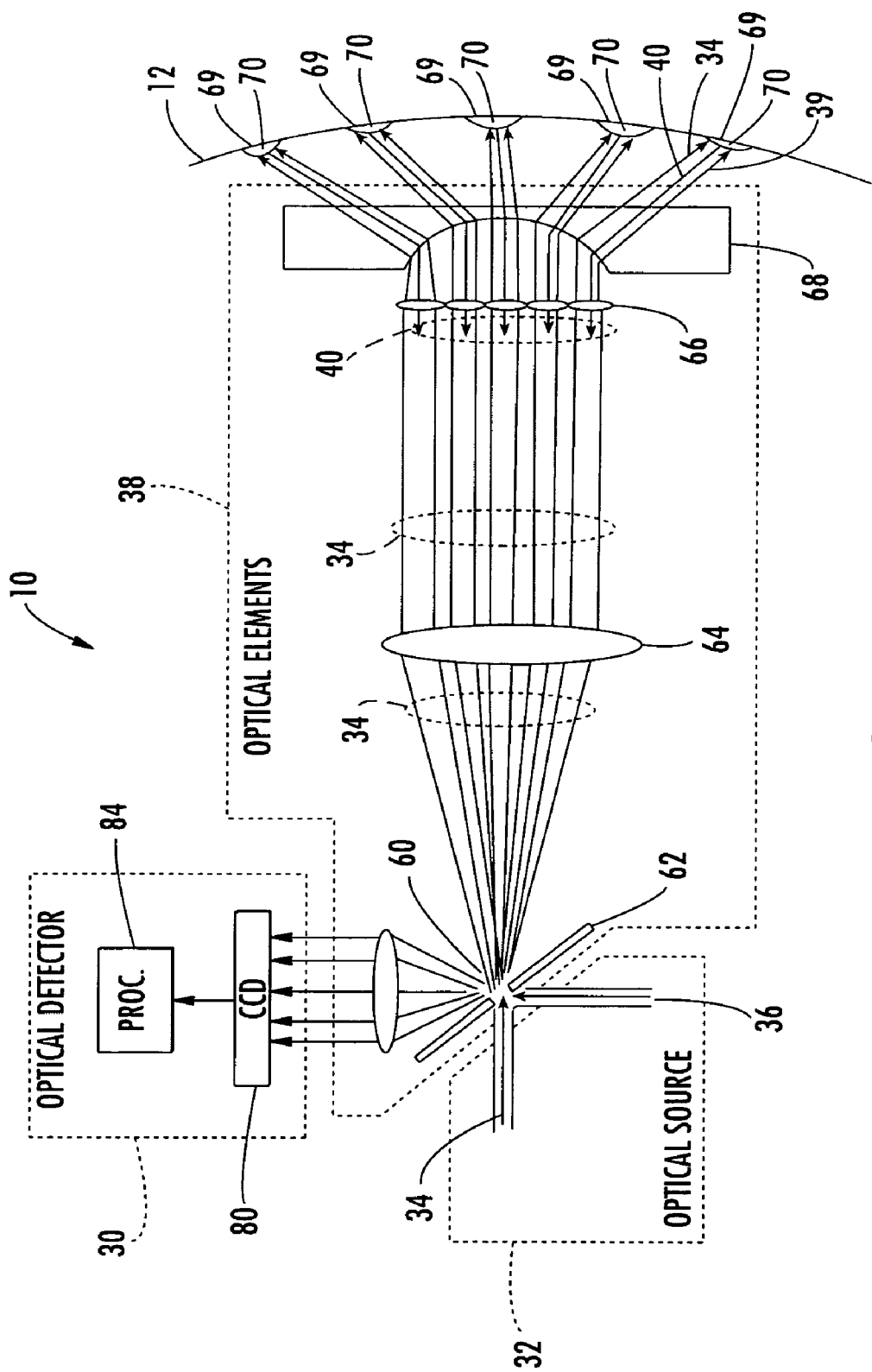
FIG. 2 is a more detailed schematic block diagram of the optical profile determining apparatus as shown in FIG. 1.
Figure 3:
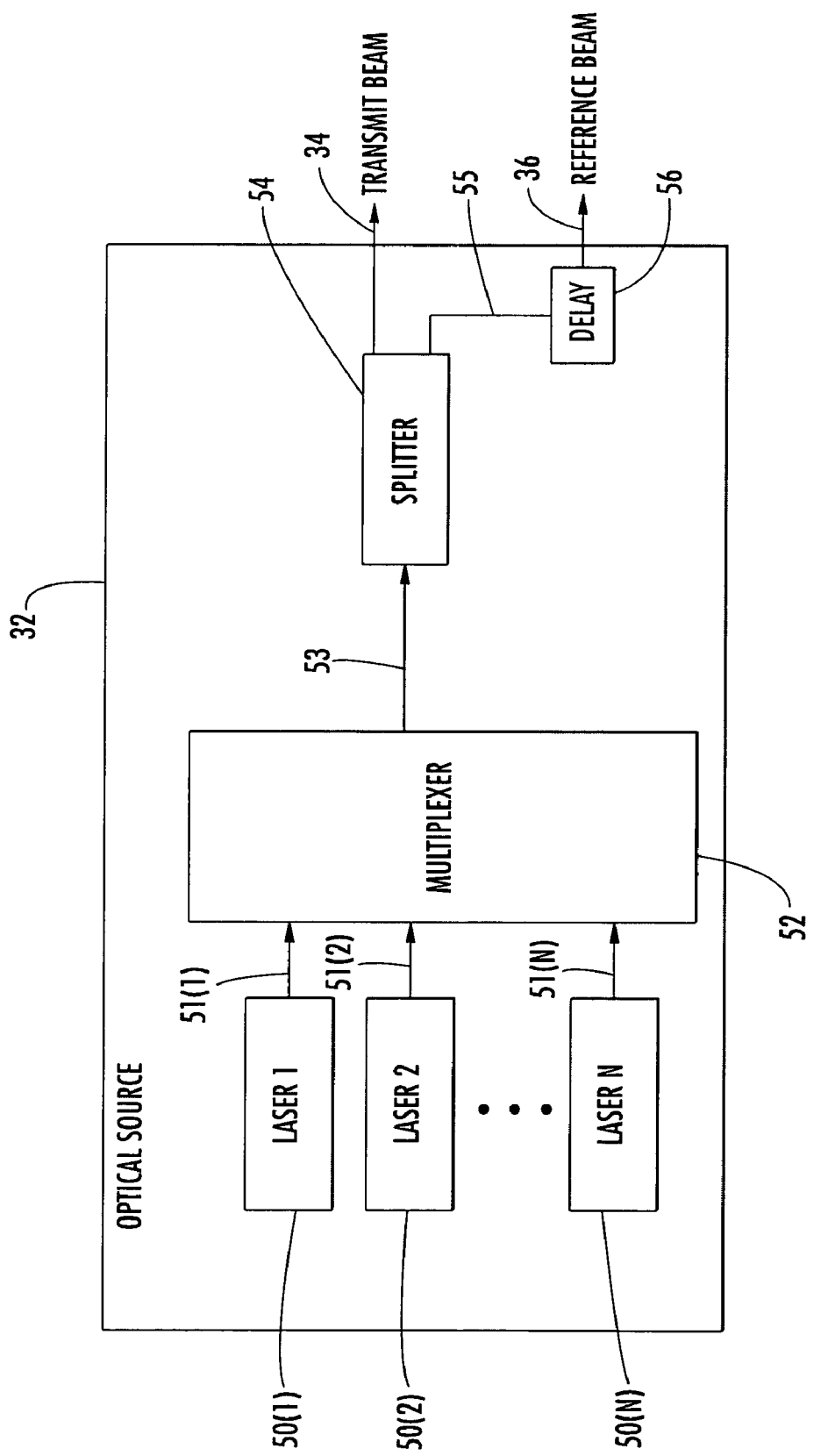
FIG. 3 is a more detailed schematic block diagram of the optical source shown in FIG. 2.

Referring initially to FIGS. 1–3, an optical profile determining apparatus 10 for a space-based parabolic antenna reflector 12 will be described. Profiling the illustrated parabolic antenna reflector 12 is just one example of how the optical profile determining apparatus 10 in accordance with the present invention can be used. The optical profile determining apparatus 10 can be used for profiling other type objects, particularly objects having a relatively low precision (millimeter range uncertainties). These objects are not limited to space-based parabolic antenna reflectors and include various ground-based objects, as readily appreciated by those skilled in the art.

The illustrated satellite 14 includes a generally cylindrical body 16 enclosing electronic circuitry 18. Two solar arrays 20 are respectively deployed on a pair of arms 22 extending from the body 16. The parabolic antenna reflector 12 is deployed at the end of a boom 24. The parabolic antenna reflector 12 has a nominal diameter of 20 meters and an F/D ratio of 0.45, for example. Control signals applied to the boom 24 from the electronic circuitry 18 command the parabolic antenna reflector 12 to a specific pointing direction.

The optical profile determining apparatus 10 includes an optical detector 30, an optical source 32 for generating a transmit beam 34 comprising a plurality of wavelengths, and for generating a reference beam 36 comprising the plurality of wavelengths. Optical elements 38 direct the transmit beam 34 to a target 12 (i.e., the illustrated parabolic antenna reflector) for directing a resulting reflected transmit beam back 40 from the target to the optical detector 30. The optical elements 38 combine the reference beam 36 with the reflected transmit beam 40 so that a profile of the target 12 is based upon fringe contrast produced by the plurality of wavelengths in the reference beam and the plurality of wavelengths in the reflected transmit beam.

Portions of the optical profile determining apparatus 10 are carried by the feeder network assembly 25, and are positioned so that it faces the interior of the parabolic antenna reflector 12. The optical profile determining apparatus 10 advantageously profiles the target 12 by using fringe contrast that is determined by the relative phase between a plurality of sets of fringes, i.e., the fringes provided by the plurality of wavelengths in the reference beam 36 interfering with the plurality of wavelengths in the reflected transmit beam 40. This is in contrast to a standard interferometer that determines an absolute fringe at a given frequency.

The optical source 32 illustratively comprises a plurality of lasers $50(1)$–$50(n)$ for generating a plurality of individual transmit beams $51(1)$–$51(n)$. Each laser $50(1)$–$50(n)$ operates at a different wavelength so that there is a spacing of about 100 GHz between the different laser frequencies, for example. This results in a 100 GHz frequency offset. As a minimum, there are at least two lasers. As will be explained in greater detail below, as the number of lasers increase, so does the sensitivity and precision of the optical profile determining apparatus 10. In addition, the accuracy of optical profile determining apparatus 10 can be extended to the submicron levels if sufficiently wide frequency is used.

The optical source 32 thus uses independent sources that are frequency multiplexed rather than a single tunable source. Each frequency source can be independently switched on and off at very high rates. The frequencies of the optical telecommunications frequency grid may be used, for example, as readily appreciated by those skilled in the art.

A multiplexer 52 multiplexes the plurality of transmit beams 51(1)–51(n) into a single combined transmit beam 53, i.e., a multiplexed transmit beam. The optical source 32 further comprises a splitter 54 downstream from the multiplexer 52 for splitting the combined transmit beam 53 into a first beam and a second beam. The first beam defines the transmit beam 34. A delay circuit 56 is illustratively provided downstream from the splitter 54 for delaying the second beam. The delayed second beam defines the reference beam 36.

The transmit beam 34 is transmitted through an opening 60 in a mirror 62. The opening may have a diameter of about 0.01 mm, for example. After the transmit beam 34 has been transmitted through the opening 60, it is received by a series of lenses that make up the optical elements 38.

In particular, the optical elements 38 illustratively comprise a first lens 64 for colliminating the transmit beam 34. A lenslet array 66 is downstream from the first lens 64 for directing the transmit beam 34 towards the target 12. A second lens 68 is downstream from the lenslet array 66 for projecting the transmit beam 34 onto the target 12 at predetermined locations 69 thereon.

The lenslet array 66 converts the transmit beam 34 into converging beams. The lenslet array 66, for example, may be arranged in 25 concentric circles with 6 lenslets in the innermost circle and 144 lenslets in the outermost circle. The beams 34 from the lenslet array 66 are collimated with a single negative lens 68 (i.e., the second lens) and are projected in a concentric pattern on the target 12.

For the illustrated example, the resulting beams (1950) are nominally 40 cm apart and 2 cm in diameter at the target 12. The optical profile determining apparatus 10 further includes a plurality of spaced apart reflectors 70 on the target 12 for providing the reflected transmit beam 40. Each reflector 70 is 2 mm in diameter, for example, and is placed at the center of each beam 34 location on the target 12. This provides well-defined points for distance measurement.

Each beam 34 that is projected through the second lens 68 onto a preset point 69 on the surface of the target 12 forms a channel. The reflected return 40 passes back through the second lens 68, the lenslet array 66 and through the first lens 64 before being reflected by the mirror 62. The mirror 62 reflects images of the lenslet array 66 onto the optical detector 30. In one embodiment, the optical detector 30 includes a photodiode array, such as the one typically found in a charge-coupled device (CCD) camera 80, and the profile of the target 12 may be based upon a single exposure of the CCD camera.

Measurements by the CCD camera 80 may thus be made in a single, short exposure to mitigate against fringe washout caused by mechanical motion. The transmit beam 34, the reflected transmit beam 40, and the reference beam 36 are multiplexed by aperture sharing rather than the more conventional method, which uses beam splitters.

The reflected transmit beam 40 is not mutually coherent in a spatial sense, and is much larger than the transmit beam 34. This allows the reflected transmit beam 40 to be separated by the mirror 62 for imaging onto the CCD camera 80, as will be appreciated by those skilled in the art. The mirror 62 also combines the reference beam 36 and the reflected transmit beam 40 prior to imaging on the CCD camera 80.

Figure 4:
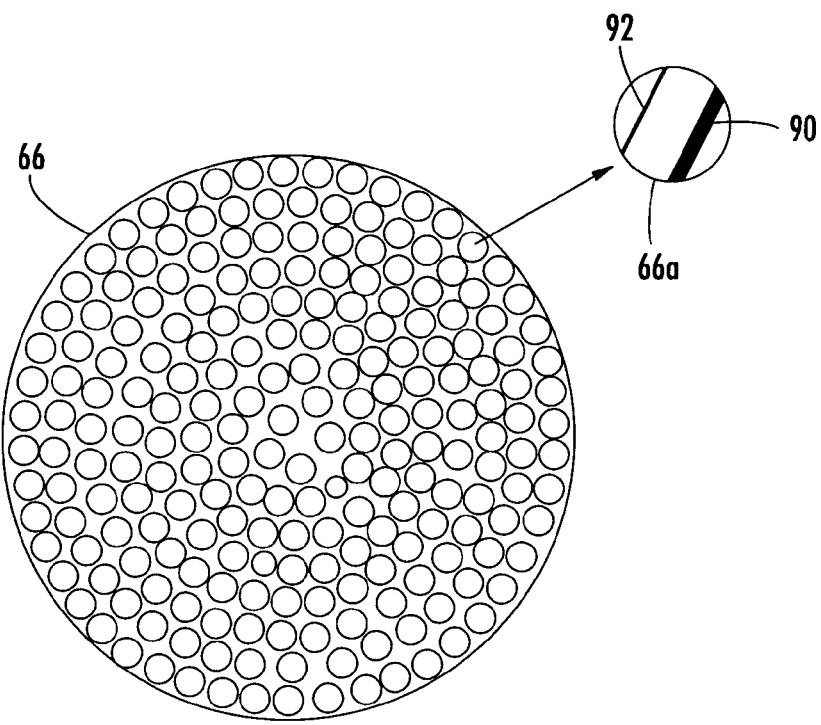
FIG. 4 is a schematic image on the optical detector shown in FIG. 2.

All of the 1950 lenslets are imaged onto a 240×240 element of the CCD camera 80 as illustrated in FIG. 4. This means that each lenslet image covers a 5×5 segment of the photodiode array in the CCD camera 80. The reference beam 36 is inserted at a sufficient angle or tilt to provide a single cycle of the fringe pattern across the image of a single lenslet. A wavefront of the reference beam 36 directed to the optical detector 30 is tilted with respect to a wavefront of the reflect transmit beam 40 directed to the optical detector. This assures that there will be one fringe maximum 90 and one fringe minimum 92 in each beam image. For purposes of simplifying the drawings, the fringes are only illustrated for an example lenslet 66a. It may be desirable to have more than one cycle of the fringes for each lens, but the illustrated example is limited by the resolution of the 240×240 element photodiode CCD camera 80.

The beams or fringes 90, 92 represent the different wavelengths in the transmit beam 34 and the different wavelengths in the reference beam 36. The phase of the resulting fringes is a measure of the difference in the optical path between the reflected transmit beam 40 path and the reference beam 36 path.

Another aspect of the present invention is directed to a method for determining a profile of a Target 12. The method comprises generating a transmit beam 34 comprising a plurality of wavelengths and a reference beam 36 also comprising the plurality of wavelengths, and directing the transmit beam to the target 12. A resulting reflected transmit beam 40 is directed back from the target 12 to an optical detector 30. The method further comprises combining the reference beam 36 with the reflected transmit beam 40 so that a profile of the target 12 is based upon fringe contrast produced by the plurality of wavelengths in the reference beam and the plurality of wavelengths in the reflected transmit beam 40.

When focusing on a single beam path for determining distance, this is the well known technique of length measurement by interferometry. The problems with interferometry are many and well known. The most difficult one is instability of the fringes due to vibrations and other path length disturbances during the measurement. A second important problem is the ambiguity of the measurement caused by the short spatial period of the fringe pattern (½ wavelength of light for a reflective system). For large structures that are not built to maintain submicron precision such as the space-based parabolic antenna reflector 12, the initial uncertainty of the structure is many times the ambiguity interval. Also, the structure may move by more than a fringe spacing during the measurement process, thus destroying the desired phase information.

The present invention makes use of multiple wavelength interferometry to address the fringe ambiguity problem. The fringe stability problem may be advantageously addressed by basing the measurement on a single, short exposure to record the necessary fringe information for computing unambiguous distances. An important feature is that the two or more frequency components of the light are used simultaneously (not sequentially) in such a way that the distance is computed from the fringe contrast not the fringe phase. The optical profile determining apparatus 10 does not measure the fringe phase at any frequency. Instead, it uses the fringe contrast to determine the relative phase between the fringe patterns generated by each of the different frequencies.

The basic principle of operation of the optical profile determining apparatus 10 will now be discussed. Consider the intensity of the resulting light when a signal beam of intensity $a^2$ is combined with a delayed reference beam of intensity $a_r^2$. Both beams are at wavelength $\lambda_a$=1550.12 nm, for example. The path length delay between the signal and reference beams is 1 meter. The resultant intensity is $$I = a^2 + a_r^2 + 2aa_r\cos\left(\frac{2\pi l}{\lambda}\right).$$

When a second beam and reference are added with the identical path delay, the equation for the fringes is $$I = a^2 + a_r^2 + 2aa_r\cos\left(\frac{2\pi l}{\lambda_a}\right) + b^2 + b_r^2 + 2bb_r\cos\left(\frac{2\pi l}{\lambda_b}\right).$$

There are no ab terms in the average intensity (averaged over the exposure time of the CCD camera 80) because the a and b lasers 50(1), 50(2) are many GHz apart in frequency and they do not mutually interfere. The extension of this equation to multiple frequencies is a matter of adding the additional terms that correspond to each of the new frequencies.

Figure 5:
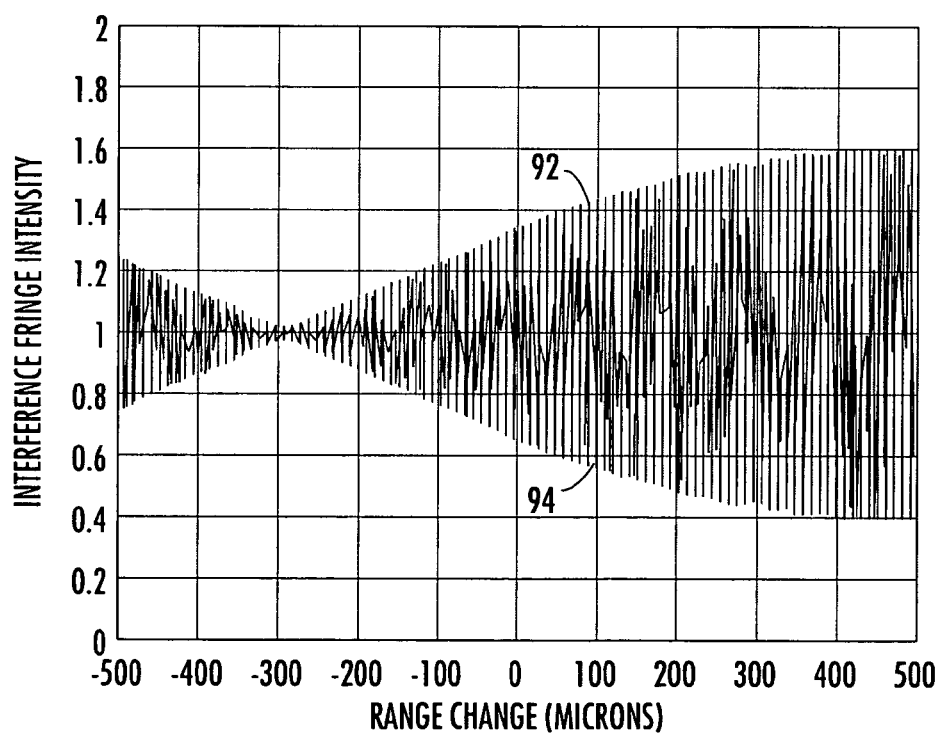
FIG. 5 is a modeled plot of computed intensity variation with range change (distance to the target) produced by the optical profile determining apparatus as shown in FIG. 1.

A computed intensity variation with range (distance to the target 12) change is shown in FIG. 5. In this example, there is a 100 GHz frequency offset between the two frequencies 90, 92 present, a 10% imbalance in average power between the two signals and a 10 to 1 ratio between the reference beam 36 level and the level of the received reflected transmit beam 40. Of course, this pattern repeats at range increments of 3.00 mm. The ratio of the peak-to-peak variation in intensity to the average intensity determines the range. These intensities are measured by the CCD camera 80 with a single, short, exposure.

The optical detector 30 includes a processor 84 connected to the CCD camera 80. Range change data as illustrated in FIG. 5 is used by the processor 84 for determining the profile of the target 12. If the interference fringe intensity (i.e., brightness) is between 1.4 (peak 92) and 0.62 (peak 94), for example, this amplitude can be translated to a range change or distortion of 100 microns. Interference fringe intensity and range change data may be stored in a memory embedded in the processor 84, or may be stored external the processor. Actuators are then used to adjust the parabolic antenna reflector 12 based upon the determined profile.

As part of a setup procedure, the fringe patterns may be measured with each laser alone. With only one frequency present, the fringes are constant in amplitude for all distances. In this way the fringe contrast for each laser is adjusted and measured. Once the individual fringe amplitudes are known, these amplitudes are used to compute the range from the combined amplitude. The processor 84 connected to the CCD camera 80 processes the received images. Similarly, a range of individual frequencies and a number of simultaneous frequency combinations are used to resolve the measurement ambiguities inherent in the periodic fringe contrast pattern.

The required signal characteristics will now be discussed. In order to perform interferometry with large path differences (1 meter), the optical source 32 should have a coherence length longer than the path difference. For good operation at path differences of two meters the coherence length of the lasers should exceed 10 meters. This corresponds to a line width of less than 30 MHz. The distance from a point near the focus to a point on the target 12 changes by approximately 2.3 meters as the reflector point moves from the center to the edge of a 20 meter reflector with F/D=0.45.

The transmit and reference beams 34, 36 will interfere to the extent that they have the same polarization. Polarization maintaining optical fiber is used in the transmit and reference fiber paths in order to maintain a fixed polarization relationship. The optical profile determining apparatus 10 should maintain a reasonable degree of polarization integrity to avoid a loss in fringe contrast.

Although the fringe patterns for all laser frequencies are measured simultaneously, the fringe pattern at each frequency is generated completely independently. The proper operation of the fringe contrast ranging system is dependent on the phase stability of the multiple fringe systems. For this reason the path for each wavelength in the measurement is maintained exactly the same from the reference splitter 54 to the superposition of the reflected transmit and reference beams 34, 36 at the fringe measurement point(s). Wavelength dependent phase shifts, such as those due to fiber dispersion, are tolerable so long as they are substantially constant during the measurement process.

The laser power requirements are based on the amount of energy required to fully expose the photodiode array of the CCD camera 80. The diodes in the photodiode array, such as InGaAs diodes, for example, are fully exposed in 0.01 seconds at $5\times10^{-9}$ watts per diode. Thus, the total power required to expose the 240×240 array segment is 0.3 milliwatts. The reference beam 36 power is selected at the CCD camera 80 to be equal to 0.2 milliwatts. This is 1% of the output for a single 20-milliwatt laser.

Splitting off 2% of the laser power for the reference beam 36 power and transmitting it through a reference optical system that has 50% efficiency achieves this power level. To achieve a 10% peak fringe contrast the transmit beam 34 power level at the photodiode must be equal to 1% of the reference beam 36 level. Therefore, the signal level must be 0.01%. This means that the optical efficiency for the signal path efficiency must be $10^{-4}$ from the laser to the surface of the target 12 and back to the photodiode array. This level of efficiency is consistent with the overall design parameters of the illustrated optical profile determining apparatus 10.

When operating near saturation, the signal to noise ratio for a single photodiode is approximately 1,000:1. The signal is integrated from approximately 25 diodes. This produces an expected signal-to-noise ratio of approximately 5,000:1. The 10% peak fringe amplitude is predicted to be more than 100 times the noise level. The expectation is that the system accuracy will be limited by background intensity shifts caused by fringe contrast perturbations due to vibration rather than photodetector noise.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

The invention claimed is:

1. An optical profile determining apparatus comprising:
    an optical detector;
    an optical source for generating a transmit beam comprising a plurality of wavelengths, and for generating a reference beam comprising the plurality of wavelengths;
    at least one optical element for directing the transmit beam to a target, for directing a resulting reflected transmit beam back from the target to said optical detector, and for combining the reference beam with the reflected transmit beam so that a profile of the target is based upon fringe contrast produced by the plurality of wavelengths in the reference beam and the plurality of wavelengths in the reflected transmit beam; and a plurality of spaced apart reflectors at the respective predetermined locations on the target for providing the reflected transmit beam;

said at least one optical element including
- a first lens for colliminating the transmit beam,
- a lenslet array downstream from said first lens for directing the transmit beam toward the target, and
- a second lens downstream from said lenslet array for projecting the transmit beam onto the target at predetermined locations thereon.

2. An apparatus according to claim 1 wherein said optical source comprises:
- a plurality of lasers for generating a plurality of individual transmit beams, each laser operating at a different wavelength; and
- a multiplexer for multiplexing the plurality of individual transmit beams into a combined transmit beam.

3. An apparatus according to claim 2 wherein said optical source further comprises:
- a splitter downstream from said multiplexer for splitting the combined transmit beam into a first beam and a second beam, the first beam defining the transmit beam; and
- a delay circuit downstream from said splitter for delaying the second beam to define the reference beam.

4. An apparatus according to claim 1 wherein said optical source provides a tilted wavefront of the reference beam directed to said optical detector with respect to a wavefront of the reflected transmit beam directed to said optical detector.

5. An apparatus according to claim 1 wherein said optical detector comprises a processor for computing a distance to the target for each reflector based upon a corresponding fringe contrast associated therewith for determining the profile of the target.

6. An apparatus according to claim 1 wherein said lenslet array comprises a plurality of lenses, each lens being associated with a respective reflector.

7. An apparatus according to claim 1 wherein said at least one optical element comprises a mirror having an opening therein for receiving the transmit beam and the reference beam, said mirror also directing the reflected transmit beam to said optical detector.

8. An apparatus according to claim 7 wherein said at least one optical element further comprises an imaging lens for directing the reflected transmit beam and the reference beam to said optical detector.

9. An apparatus according to claim 1 wherein said optical detector comprises a processor for computing a distance to the target based upon an amplitude of the fringe contrast.

10. An apparatus according to claim 9 wherein said processor computes the distance to the target using the amplitude of the fringe contrast in a ratio of a peak-to-peak variation in intensity to an average intensity.

11. An apparatus according to claim 1 wherein said optical detector comprises a charge-coupled device (CCD).

12. An apparatus according to claim 11 wherein the profile of the target is based upon a single exposure of said CCD.

13. An optical profile determining apparatus comprising:
an optical detector;
a plurality of lasers for generating a plurality of individual transmit beams, each laser operating at a different wavelength;
a multiplexer for multiplexing the plurality of individual transmit beams into a combined transmit beam;
a splitter downstream from said multiplexer for splitting the combined transmit beam into a first beam and a second beam, the first beam defining a transmit beam;
a delay circuit downstream from said splitter for delaying the second beam to define a reference beam;
at least one optical element for directing the transmit beam to a target, for directing a resulting reflected transmit beam back from the target to said optical detector, and for combining the reference beam with the reflected transmit beam so that a profile of the target is based upon fringe contrast produced by the plurality of wavelengths in the reference beam and the plurality of wavelengths in the reflected transmit beam; and
a plurality of spaced apart reflectors at the respective predetermined locations on the target for providing the reflected transmit beam;
said at least one optical element including
- a first lens for colliminating the transmit beam,
- a lenslet array downstream from said first lens for directing the transmit beam toward the target, and
- a second lens downstream from said lenslet array for projecting the transmit beam onto the target at predetermined locations thereon.

14. An apparatus according to claim 13 wherein the reference beam directed to said optical detector has a wavefront that is tilted with respect to a wavefront of the reflected transmit beam directed to said optical detector.

15. An apparatus according to claim 14 wherein said optical detector comprises a processor for computing a distance to the target for each reflector based upon a corresponding fringe contrast associated therewith for determining the profile of the target.

16. An apparatus according to claim 14 wherein said lenslet array comprises a plurality of lenses, each lens being associated with a respective reflector.

17. An apparatus according to claim 13 wherein said at least one optical element comprises a mirror having an opening therein for receiving the transmit beam and the reference beam, said mirror also directing the reflected transmit beam to said optical detector.

18. An apparatus according to claim 17 wherein said at least one optical element further comprises an imaging lens for directing the reflected transmit beam and the reference beam to said optical detector.

19. An apparatus according to claim 13 wherein said optical detector comprises a processor for computing a distance to the target based upon an amplitude of the fringe contrast.

20. An apparatus according to claim 19 wherein said processor computes the distance to the target using the amplitude of the fringe contrast in a ratio of a peak-to-peak variation in intensity to an average intensity.

21. An apparatus according to claim 13 wherein said optical detector comprises a charge-coupled device (CCD).

22. An apparatus according to claim 21 wherein the profile of the target is based upon a single exposure of said CCD.

23. A method for determining a profile of a target comprising:
generating a transmit beam comprising a plurality of wavelengths, and generating a reference beam comprising the plurality of wavelengths;
directing the transmit beam to a target;
directing a resulting reflected transmit beam back from the target to an optical detector; and
combining the reference beam with the reflected transmit beam so that a profile of the target is based upon fringe contrast produced by the plurality of wavelengths in the reference beam and the plurality of wavelengths in the reflected transmit beam;

wherein directing the transmit beam and the resulting reflected transmit beam is performed using at least one optical element including
a first lens for colliminating the multiplexed transmit beam,
a lenslet array downstream from the first lens for directing the transmit beam toward the target, and
a second lens downstream from the lenslet array for projecting the transmit beam onto the target at predetermined locations thereon;
wherein a plurality of spaced apart reflectors are at the respective predetermined locations on the target for providing the reflected transmit beam.

24. A method according to claim 23 wherein generating the transmit and reference beams comprises:
generating a plurality of individual transmit beams using a plurality of lasers operating at different wavelengths;
multiplexing the plurality of individual transmit beams into a combined transmit beam;
splitting the combined transmit beam into a first beam and a second beam, the first beam defining the transmit beam; and
delaying the second beam to define the reference beam.

25. A method according to claim 23 wherein a wavefront of the transmit beam being directed to the optical detector is tilted with respect to a wavefront of the reflected transmit beam being directed to the optical detector.

26. A method according to claim 23 further comprising computing a distance to the target for each reflector based upon a corresponding fringe contrast associated therewith for determining the profile.

27. A method according to claim 23 wherein the lenslet array comprises a plurality of lenses, each lens being associated with a respective reflector.

28. A method according to claim 23 further comprising directing the transmit beam and the reference beam through an opening in a mirror, the mirror also for directing the reflected transmit beam to the optical detector.

29. A method according to claim 23 further comprising computing a distance to the target based upon an amplitude of the fringe contrast.

30. A method according to claim 29 wherein computing the distance to the target includes using the amplitude of the fringe contrast in a ratio of a peak-to-peak variation in intensity to an average intensity.

31. A method according to claim 23 wherein the optical detector comprises a charge-coupled device (CCD).

32. A method according to claim 31 wherein the profile of the target is determined based upon a single exposure of the CCD.

33. An optical profile determining apparatus comprising:
an optical detector;
an optical source for generating a transmit beam comprising a plurality of wavelengths, and for generating a reference beam comprising the plurality of wavelengths; and
at least one optical element for directing the transmit beam to a target, for directing a resulting reflected transmit beam back from the target to said optical detector, and for combining the reference beam with the reflected transmit beam so that a profile of the target is based upon fringe contrast produced by the plurality of wavelengths in the reference beam and the plurality of wavelengths in the reflected transmit beam, said at least one optical element comprising a mirror having an opening therein for receiving the transmit beam and the reference beam, said mirror also directing the reflected transmit beam to said optical detector.

34. An apparatus according to claim 33 wherein said at least one optical element further comprises an imaging lens for directing the reflected transmit beam and the reference beam to said optical detector.

35. An optical profile determining apparatus comprising:
an optical detector;
a plurality of lasers for generating a plurality of individual transmit beams, each laser operating at a different wavelength;
a multiplexer for multiplexing the plurality of individual transmit beams into a combined transmit beam;
a splitter downstream from said multiplexer for splitting the combined transmit beam into a first beam and a second beam, the first beam defining a transmit beam;
a delay circuit downstream from said splitter for delaying the second beam to define a reference beam; and
at least one optical element for directing the transmit beam to a target, for directing a resulting reflected transmit beam back from the target to said optical detector, and for combining the reference beam with the reflected transmit beam so that a profile of the target is based upon fringe contrast produced by the plurality of wavelengths in the reference beam and the plurality of wavelengths in the reflected transmit beam, said at least one optical element comprises a mirror having an opening therein for receiving the transmit beam and the reference beam, said mirror also directing the reflected transmit beam to said optical detector.

36. An apparatus according to claim 35 wherein said at least one optical element further comprises an imaging lens for directing the reflected transmit beam and the reference beam to said optical detector.

37. A method for determining a profile of a target comprising:
generating a transmit beam comprising a plurality of wavelengths, and generating a reference beam comprising the plurality of wavelengths;
directing the transmit beam to a target;
directing a resulting reflected transmit beam back from the target to an optical detector; and
combining the reference beam with the reflected transmit beam so that a profile of the target is based upon fringe contrast produced by the plurality of wavelengths in the reference beam and the plurality of wavelengths in the reflected transmit beam;
wherein the transmit beam and the reference beam are directed through an opening in a mirror, the mirror also for directing the reflected transmit beam to the optical detector.

38. The method according to claim 36 wherein the reflected transmit beam and the reference beam are directed to the optical detector with an imaging lens.

* * * * *